US012288654B2

(12) United States Patent
Fuchs et al.

(10) Patent No.: US 12,288,654 B2
(45) Date of Patent: Apr. 29, 2025

(54) SWITCH FOR A HAND-HELD POWER TOOL

(71) Applicant: Festool GmbH, Wendlingen (DE)

(72) Inventors: Martin Fuchs, Lorch (DE); Philipp Huggenberger, Munningen (DE)

(73) Assignee: Festool GmbH, Wendlingen (DE)

( * ) Notice: Subject to any disclaimer, the term of this patent is extended or adjusted under 35 U.S.C. 154(b) by 577 days.

(21) Appl. No.: 17/614,040

(22) PCT Filed: May 20, 2020

(86) PCT No.: PCT/EP2020/064191

§ 371 (c)(1),
(2) Date: Nov. 24, 2021

(87) PCT Pub. No.: WO2020/239600

PCT Pub. Date: Dec. 3, 2020

(65) Prior Publication Data

US 2022/0230818 A1 Jul. 21, 2022

(30) Foreign Application Priority Data

May 28, 2019 (DE) .................... 10 2019 114 287.3

(51) Int. Cl.
*H01H 3/40* (2006.01)
*B25F 5/00* (2006.01)
(Continued)

(52) U.S. Cl.
CPC ............... *H01H 3/40* (2013.01); *B25F 5/001* (2013.01); *H01H 3/20* (2013.01); *H01H 9/04* (2013.01);
(Continued)

(58) Field of Classification Search
CPC .. H01H 3/20; H01H 3/52; H01H 9/04; H01H 9/063; H01H 15/22; H01H 2009/065;
(Continued)

(56) References Cited

U.S. PATENT DOCUMENTS

2011/0056813 A1 3/2011 Nishikimi et al.
2012/0234657 A1 9/2012 Nishikimi et al.
(Continued)

FOREIGN PATENT DOCUMENTS

CN 202726870 U 2/2013
CN 108290265 A 7/2018
(Continued)

OTHER PUBLICATIONS

Japanese Office Action dated Oct. 17, 2023.
Chinese Office Action dated Aug. 1, 2024.

*Primary Examiner* — Anthony R Jimenez
(74) *Attorney, Agent, or Firm* — Hoffmann & Baron, LLP

(57) ABSTRACT

A switch (30) for a hand-held power tool (10) or as a component of a hand-held power tool (10), which has an electric drive motor (16) that can be switched by the switch (30). The switch (30) has a switch housing (33) with a switch chamber (35) in which a switch actuator (75) that can be moved between at least two switch positions (ML, MR) is arranged in order to actuate an electric switch element, said switch actuator being kinetically coupled, by means of a transmission element (70), to a switch (30) actuation element (32), which is arranged outside the switch housing (33) and can be moved between at least two actuation positions (R, L), wherein the transmission element (70) passes through a through-opening (54) on a wall of the switch housing (33) such that the switch actuator (75) can be moved by moving the actuation element (32) in order to actuate the switch element (24). A rotary bearing (77) is arranged in the through-opening (54), the transmission element (70) being rotatably mounted on the rotary bearing about a rotational axis (D).

41 Claims, 4 Drawing Sheets

(51) Int. Cl.

| | |
|---|---|
| ***H01H 3/20*** | (2006.01) |
| ***H01H 9/04*** | (2006.01) |
| ***H01H 9/06*** | (2006.01) |
| ***H01H 13/52*** | (2006.01) |
| ***H01H 15/22*** | (2006.01) |

(52) U.S. Cl.
CPC ............ *H01H 9/063* (2013.01); *H01H 15/22* (2013.01); *H01H 2009/065* (2013.01); *H01H 13/52* (2013.01)

(58) Field of Classification Search
CPC .. H01H 21/08; H01H 21/22; H01H 2223/002; H01H 3/40; H01H 21/00; H01H 21/04; H01H 21/085; H01H 2223/00; H01H 2231/048; H01H 19/585; H01H 15/00; H01H 15/005; H01H 15/02; H01H 15/10; H01H 15/24; H01H 2009/00; H01H 2009/06; H01H 2009/066; H01H 9/06; H01H 3/32; B25F 5/001
USPC ........................................................ 200/43.17
See application file for complete search history.

(56) References Cited

U.S. PATENT DOCUMENTS

| | | | |
|---|---|---|---|
| 2014/0225331 | A1 | 8/2014 | Hozumi et al. |
| 2016/0351355 | A1 | 12/2016 | Hozumi |
| 2016/0358728 | A1 | 12/2016 | Hozumi et al. |
| 2017/0288583 | A1 | 10/2017 | Ma et al. |

FOREIGN PATENT DOCUMENTS

| | | | |
|---|---|---|---|
| EP | 2 366 494 | A1 | 9/2011 |
| EP | 3101670 | | 12/2016 |
| EP | 3101670 | A2 | 12/2016 |
| JP | 2007-157402 | A | 6/2007 |
| JP | 2011-051079 | A | 3/2011 |
| JP | 2012-206248 | A | 10/2012 |
| JP | 2014-179312 | A | 9/2014 |
| JP | 2016-225147 | A | 12/2016 |

SWITCH FOR A HAND-HELD POWER TOOL

This application is a National Stage application based on International Application No. PCT/EP2020/064191, filed May 20, 2020, which claims priority to DE 102019114287.3, filed May 28, 2019.

BACKGROUND OF THE INVENTION

The invention relates to a switch for a hand-held power tool or as a component of a hand-held power tool, which has an electric drive motor that can be switched on by the switch, wherein the switch has a switch housing with a switch chamber in which a switch actuator that can be moved between at least two switch positions is arranged in order to actuate an electric switch element and is movement-coupled with the aid of a transmission element to an actuating element of the switch which is movable between at least two actuating positions, wherein the transmission element passes through a through opening in a wall of the switch housing, so that the switch actuator may be moved by moving the actuating element to actuate the switch element.

Such a switch is described in EP 2 395 527 A1. The switch has a magnetic pick-up as switch actuator, which is located in a switch chamber of the switch housing. Through pressure actuation of the actuating element, the switch actuator may be moved so as to switch on the drive motor and vary its speed.

For setting the respective direction of rotation of the drive motor, for example for the screwing in and out of screws, a separate switch element is provided, which likewise operates magnetically. However, the magnetic switch actuator of the direction of rotation switch tends to attract ferromagnetic dust, chips and the like, so that the hand-operated power tool can no longer be used.

SUMMARY OF THE INVENTION

It is therefore the problem of the present invention to provide an improved switch for a hand-operated power tool, and a hand-operated power tool equipped with it.

To solve the problem it is provided, for a switch of the type described above, that at the through opening a rotary bearing is located, on which the transmission element is rotatably mounted around a rotation axis.

The rotary bearing makes possible in a simple manner for example a design of the switch as a direction of rotation switch, i.e. that by the movement of the switch actuator the direction of rotation of the drive motor is presettable, for example clockwise rotation or anti-clockwise rotation of a tool holder of the hand-operated power tool.

For example the rotary bearing is in the form of a slide bearing. The rotary bearing may however also comprise a rolling bearing, for example a ball bearing or roller bearing.

Preferably the rotary bearing is a part of the through opening, or part of the wall on which the through opening is provided. For example the through opening itself is designed as a bearing location for the actuating element.

The rotary bearing, or a rotary bearing supporting the actuating element around its rotation axis may however also be arranged directly next to the through opening. For example the rotary bearing may comprise a rolling bearing or slide bearing which is in the form of a rotary bearing separate from the wall on which the through opening is provided or is a separate component. In this variant the through opening itself for example may not be designed as rotary bearing for the actuating element. However, even in this scenario it is advantageous for the actuating element to actually pass through the through opening, but to be sealed at the through opening.

It is preferred that the rotation axis passes through the wall on which the rotary bearing is mounted. For example the rotation axis runs parallel to a side wall face of the wall, i.e. the rotary bearing is mounted directly in the wall but has a rotation axis which is for example parallel to the wall of the switch housing and runs in the wall.

A preferred concept provides however that the rotation axis is at an angle, in particular a right-angle, to a wall surface of the wall on which the rotary bearing is mounted. Without further ado, however, it is also possible that the rotation axis is at an oblique angle, i.e. not a right-angle, to the wall surface. For example the transmission element is in the form of a shaft element or has a shaft section which is rotatably mounted in the rotary bearing round the rotation axis, which passes through the wall surface at an angle.

A preferred concept provides for the switch chamber to be closed apart from the through opening in which the rotary bearing is mounted or which forms the rotary bearing. Therefore the transmission element closes the through opening or is held with sealing in the through opening. The switch chamber houses the switch actuator tightly so that environmental influences, for example dust, in particular ferromagnetic dust, cannot penetrate into the switch housing and/or into the switch chamber in which the switch actuator is located.

Provided at the through opening are preferably shift-lock contours or a shift-lock for a non-displaceable hold of the transmission element parallel to its rotation axis or along the rotation axis. The transmission element is therefore held on the through opening preferably non-displaceably relative to its rotation axis. The shift-lock or the shift-lock contours comprise for example an arrangement of interlocking contours engaging in one another, wherein one interlocking contour is arranged on the transmission element, the other interlocking contour on the through opening or the wall of the switch housing with the through opening. The interlocking contours facilitate preferably rotatability of the transmission element around its rotation axis and/or support the transmission element around its rotation axis and/or form a component of the rotary bearing mounted at the through opening.

The shift-lock contours include for example an annular flange extending around the rotation axis as a part ring or a complete ring and engaging in an annular slot which is a part ring or a full ring. The annular flange may be located on the transmission element and the annular slot on the through opening. However, the reverse is also possible, with the annular flange provided on the through opening, i.e. for example protruding radially inwards into the through opening, while the annular slot is located on the transmission element. It goes without saying that the annular flange may include two or more partly ring-shaped annular flange sections, between which angular clearances relative to the rotation axis are provided. It also goes without saying that, with regard to the rotation axis of the transmission element, at least two pairs of annular flange and annular slot may be provided, with axial spacing, each engaging in one another. The annular flange is for example disc-shaped. The annular flange and/or the annular slot are preferably integral with the transmission element.

The annular flange and the annular slot may for example be parts of the seal explained below. In particular, the annular flange and the annular slot advantageously form part of a labyrinth seal. It is however also possible that the annular flange and the annular slot have no sealing function, for example when they are only partly annular.

Provided at the through opening and/or on the rotary bearing is preferably a seal. It is preferred if the rotary bearing and/or the through opening are or is in the form of a seal or have or has a seal. For example parts of a labyrinth seal may at the same time be parts of the rotary bearing or the through opening. Preferably, components complementary to the seal, for example also components of a labyrinth seal, are located on the transmission element.

The seal may for example comprise a sliding seal in the form of a slide bearing, an O-ring or the like.

It is preferred if the seal encompasses the transmission element annularly. For example it is advantageous if the seal includes a seal flange which engages in an annular seal location. The seal flange is for example arranged on the transmission element, while the annular seal location is arranged on a bearing location of the rotary bearing. It is however also possible that the rotary bearing has an annular seal flange protruding radially inwards to the transmission element and engaging in an annular seal location on the transmission element. Also suitable as a seal flange is an O-ring. In particular it is possible that an O-ring or another rubber seal or elastic seal is fitted to a seal flange.

It is preferred if the seal comprises or is formed by a labyrinth seal. For example the aforementioned seal flange may be in the form of a labyrinth seal. It is preferred if, between the transmission element and the through opening, only a labyrinth seal is provided, and no elastic seal. The labyrinth seal may at the same time form a slide bearing or form a part of a slide bearing. By this means it is for example possible to obtain lower wear, if the transmission element rotates in the rotary bearing or slide bearing.

The actuating element, which drives or actuates the rotatable transmission element, is preferably mounted in a translational manner on a slide bearing, relative to the switch housing. The slide bearing may be a part of the switch housing or mounted on the switch housing. It is preferred if the slide bearing is provided on the machine casing of the hand-operated power tool.

Between the switch and the actuating element, in particular between the transmission element and the actuating element, there is preferably provided a transmission gear. Naturally it is possible for a transmission gear to be provided between the transmission element and the switch actuator.

The transmission gear may be located wholly or partly within the switch housing, in particular inside the switch chamber. Preferably, however, the transmission gear is located wholly or fully outside the switch housing. Consequently, for example, only a portion of the transmission element and the switch actuator are located within the switch housing or the switch chamber.

The transmission gear is preferably designed or provided to convert a linear or translational movement of the actuating element into a rotational movement of the switch actuator. Such a conversion may occur for example with the aid of a wedge gear or a bevel gear. Also a gear mechanism, in particular a combination of rack and gearwheel, may provide the aforementioned function. Provided for example on the actuating element is a rack or a rack section, which meshes with a gear or a rotating tooth arrangement on the transmission element. In an especially preferred embodiment, which is shown in the drawing, it is provided that the transmission gear comprises or is formed by a crank gear.

The transmission gear has preferably a drive section connected to the actuating element and/or driven by the actuating element, together with an output section driving for carrying the switch actuator. Preferably the drive section and/or the output section are located on the transmission element. In particular the transmission element is integral with the drive section and the output section.

It is advantageous when the transmission element is in the form of a crankshaft element or a crankshaft or is rotationally connected or firmly coupled to a crankshaft. For example the transmission element has a shaft section which is rotatably mounted at the through opening of the switch housing. From the shaft section a crank arm protrudes at an angle, in particular a right-angle. From the crank arm in turn protrudes at an angle, in particular a right-angle, an actuating arm. The shaft section and the actuating arm run preferably parallel to one another or have longitudinal extensions running parallel to one another. The shaft section, the crank arm and the actuating arm form for example a step contour or run stepped viewed from the side. It is preferred if only the shaft section engages in the switch housing and/or penetrates the through opening. The shaft section protrudes for example from the through opening on opposite sides. It is also advantageous if there is provided on the shaft section at least one seal for sealing the shaft section at the switch housing and/or one of the shift-lock contours and/or at least one of annular slot or annular flange in another annular slot or annular flange on the switch housing, in particular at the through opening.

It is advantageous if the transmission element has a shaft section which protrudes freely from the or a wall or side wall of the switch housing into a switch chamber of the switch housing bounded by the wall or side wall. Advantageously arranged on the shaft section is the aforementioned seal and/or one of the shift-lock contours and/or an annular flange extending around the rotation axis in a partly or completely annular manner and/or a partly or completely annular slot. The partly annular or annular flange or flanges of the shaft section engages or engage in an annular slot on the through opening, while the annular slot on the shaft section engages with a projection protruding radially to the rotation axis, for example an annular flange.

In both aforementioned embodiments of the transmission element, a shaft section is provided. The switch actuator is preferably located on the shaft section. An actuating arm or crank arm of the transmission element provided for rotary actuation of the transmission element around the rotation axis is preferably radially further away from the shaft section than the switch actuator, relative to the rotation axis. The switch actuator is for example a non-contact switch actuator, in particular a magnet sensor or magnet.

Also possible however is that the transmission gear redirects a linear movement direction of the actuating element in a first direction into a linear movement of the switch actuator in a second direction differing from the first direction, for example a direction at an angle, in particular a right-angle, to the first direction.

On the transmission gear there are preferably no blocking contours by which, if one actuating element is in a predetermined actuating position, the other actuating element may be blocked.

The transmission element is preferably mounted both on the rotary bearing, which is located on the wall of the switch housing and also, with longitudinal clearance relative to the rotation axis, on the switch housing, for example on a wall of the switch housing which lies opposite the through opening. It is advantageous if the transmission element is rotatably mounted on opposite walls of the switch housing relative to its rotation axis.

An advantageous concept provides that the switch not only has the aforementioned actuating element and switch actuator, but that the actuating element forms a first actuating element and the switch actuator forms a first switch actuator to actuate the switch element, which represents a first switch element. The switch also has a second actuating element, located outside the switch housing and adjustable between at least two actuating positions, together with a second switch actuator, actuable by the second actuating element to actuate a second electrical switch element. Thus the switch can therefore perform a second function with the aid of the second switch actuator and the second electrical switch element.

The second actuating element is preferably movement-coupled to the second switch actuator with the aid of a second transmission element, which penetrates a second through opening in a wall of the switch housing. This wall may be the same wall on which the transmission element of the first switch actuator is also rotatably mounted.

The second transmission element may certainly also be mounted rotatably with respect to the switch housing. It is however preferred if the second transmission element is mounted linearly along a sliding axis with respect to the switch housing.

It is advantageous if the second transmission element penetrates the through opening with linear movement along a sliding axis, being for example movably mounted at the through opening. At the same time it is especially preferred if the sliding axis is parallel to the rotation axis of the first switch actuator.

With the second transmission element and the second switch actuator for example the drive motor may be switched on and/or off and/or its speed may be varied.

It is preferred if the actuating elements are located on the same side of the switch housing. Consequently, both actuating elements may be operated by one operator from the same side.

It is advantageous if the rotation axis of the first transmission element and the sliding axis of the second transmission element enclose an angle of less than 90°, in particular less than 60°, and especially preferred less than 30° to one another.

It is advantageous if the rotation axis of the first transmission element and the sliding axis of the second transmission element are parallel to one another or run parallel to one another.

At least one of the actuating elements or both actuating elements expediently have blocking contours for blocking the other actuating element. In particular it is advantageous if the actuating elements and/or the blocking contours of the actuating elements are designed for reciprocal blocking. For example it is possible that one of the actuating elements in a predetermined actuating position, for example an intermediate actuating position, blocks an actuation of the other actuating element from a first actuating position into a second actuating position. Thus it is possible to provide for example that the sliding actuating element, when moved from its non-actuated initial position into an actuating position, blocks any actuation of the first actuating element, so that for example a direction of rotation of the drive motor cannot be changed over when the drive motor is already running. It is however also possible that the actuating element for direction of rotation, preferably the first actuating element, only allows actuation of the second actuating element, with which the drive motor may be switched on, when the first actuating element is in a defined first or second actuating position, but not in an intermediate position between the first and second actuating position.

In the first and second actuating position, the first actuating element may be used for example to set clockwise or anti-clockwise rotation of the drive motor.

The blocking contours are preferably provided directly on the respective actuating element, in particular its actuating body or actuating housing.

The switch chamber accommodating the first switch actuator expediently forms a first switch chamber. The second switch actuator is located in a second switch chamber separate from this first switch chamber. Consequently, therefore, both switch actuators are mounted in switch chambers which are separate from one another.

For example it is possible for the first and second switch chambers to be separated or screened off from one another by a partition wall. The partition wall may for example be joined to the side walls or peripheral walls of the switch housing.

It is also advantageous if the first switch chamber is sealed off from the second switch chamber. For example, sealing contours, sealing projections or the like are provided, which engage in one another and seal and separate the switch chambers from one another. It is advantageous for at least one labyrinth seal and/or an elastic seal or rubber seal to be provided between the first and second switch chambers.

The second switch chamber is expediently closed or sealed for the second transmission element except for the second through opening or bearing opening. For example the first and/or second switch chamber are or is encompassed by peripheral walls, in each case a base and a ceiling.

Preferably provided at the second through opening or bearing opening for the second transmission element is a seal, for example a ring seal, an O-ring or the like. Also, the sealing measures already cited in connection with the first transmission element, for example a sealing flange which engages in an annular seal location, are readily possible in connection with the second transmission element.

Preferably it is provided for the switch that it has a spring assembly for biasing at least one switch actuator, in particular the second switch actuator, into a predetermined switching position. A latching arrangement, clamping arrangement or other fixing arrangement for engaging or fixing at least one switch actuator in a predetermined switching position is advantageous. For example the first actuating element or a component connected to the first actuating element may be engaged with the aid of the latching arrangement or fixing arrangement, in particular to fix a direction of rotation presetting of the switch.

The spring assembly or latching arrangement may act directly on the switch actuator, but also on the relevant actuating element which actuates the switch actuator.

At least one switch actuator, preferably both switch actuators, is or are in the form of magnets or have a magnetic pick-up or a non-contact switch actuator, e.g. a capacitive or optical sensor, or are so designed. Naturally other actuating principles are also readily possible, for example mechanically operating actuating principles, optical sensors, etc. The switch actuator may also for example actuate electrical contacts, for example between a switch-on position and a switch-off position.

At least one of the electrical switch elements is expediently located outside the switch housing and/or on a printed circuit board. The printed circuit board expediently forms a part of a power supply unit for power supply of the drive motor of the hand-operated power tool. Thus it is possible for example to provide on the printed circuit board one or more switch elements which may be actuated by the switch. Therefore the switch may indeed have the switch element but this is not essential. It is sufficient when the switch element represents a part of the printed circuit board, while the switch actuator or actuators represent part of the switch according to the invention.

The electrical switch element or elements which may be operated by the switch are advantageously provided on a printed circuit board, with the relevant switch element preferably arranged in sandwich form between the switch housing and the printed circuit board. Alternatively or additionally it is advantageous when the printed circuit board is cast with the switch housing with the aid of a casting compound. It is preferred if the switch housing or the switch have sealing projections which extend towards the printed circuit board and bound a locating capacity for the respective switch element. Therefore it is for example possible that the casting compound does not flow as far as the switch element, but instead is held by the sealing projections as it were outside the cavity for the switch element.

The invention also relates to a hand-operated power tool with a switch according to the above description.

A hand-operated power tool according to the invention is preferably a screwdriver and/or a drill. But other hand-operated power tools may also readily be equipped with the switch according to the invention, in particular such hand-operated power tools as those for which, with the aid of the switch according to the invention, a direction of rotation of the drive motor may be preset, for example clockwise or anti-clockwise rotation.

The switch housing is preferably in two parts or has two matching housing shells which, when fitted to one another, define one or more switch chambers. For example the switch housing includes a housing base part which is covered by a housing cover. On the housing base part and housing cover, side walls protruding in each case towards the respective other part may be provided. Preferably a seal is provided between the two housing parts, the housing base part and the housing cover. The housing parts, i.e. the housing base part and the housing cover may in a complementary manner bound a through opening or bearing opening for one or both of the aforementioned transmission elements.

BRIEF DESCRIPTION OF THE DRAWINGS

An embodiment of the invention is explained below with the aid of the drawing, which shows in.

DETAILED DESCRIPTION

Figure 1:
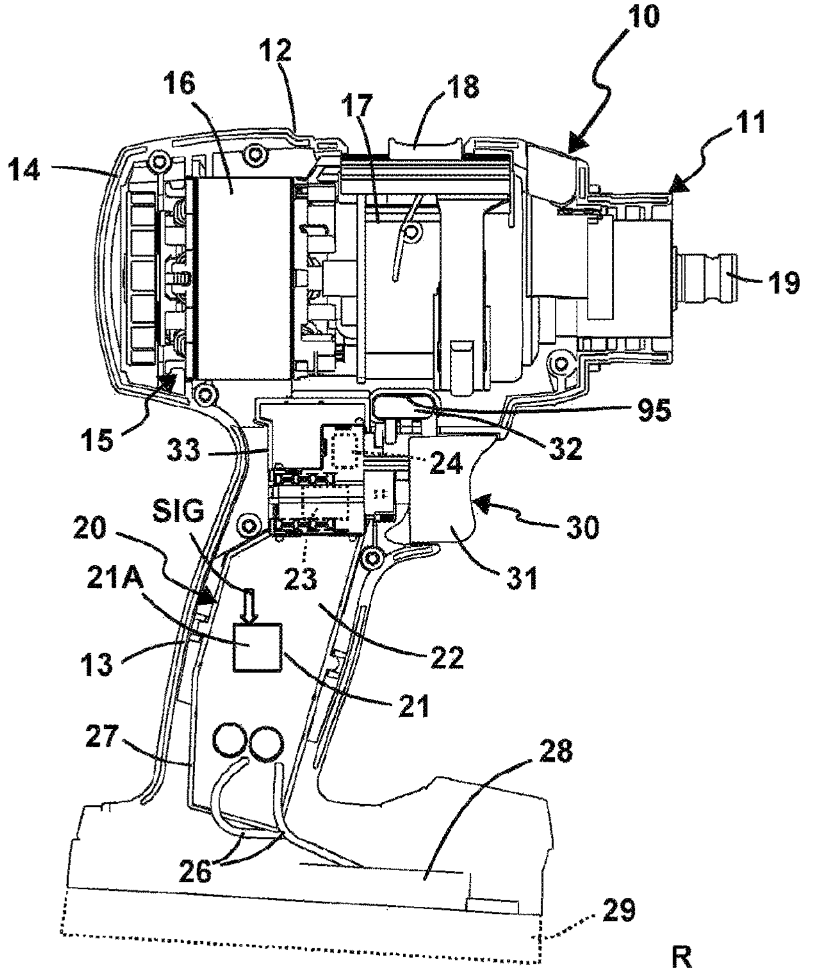
FIG. 1 a side view of a hand-operated power tool with a switch and with its machine casing open FIG. 2 a top view of a power supply unit and the switch of the hand-operated power tool according to FIG. 1
Figure 2:
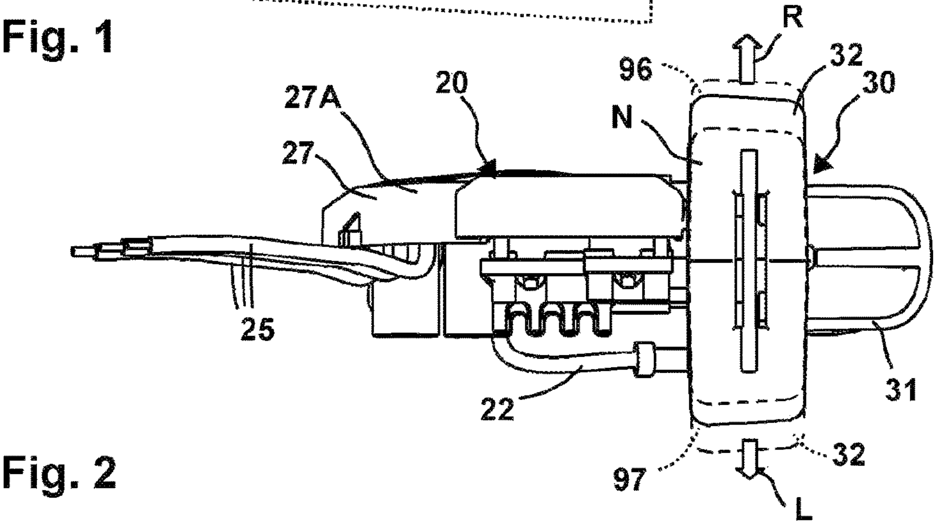
Figure 3:
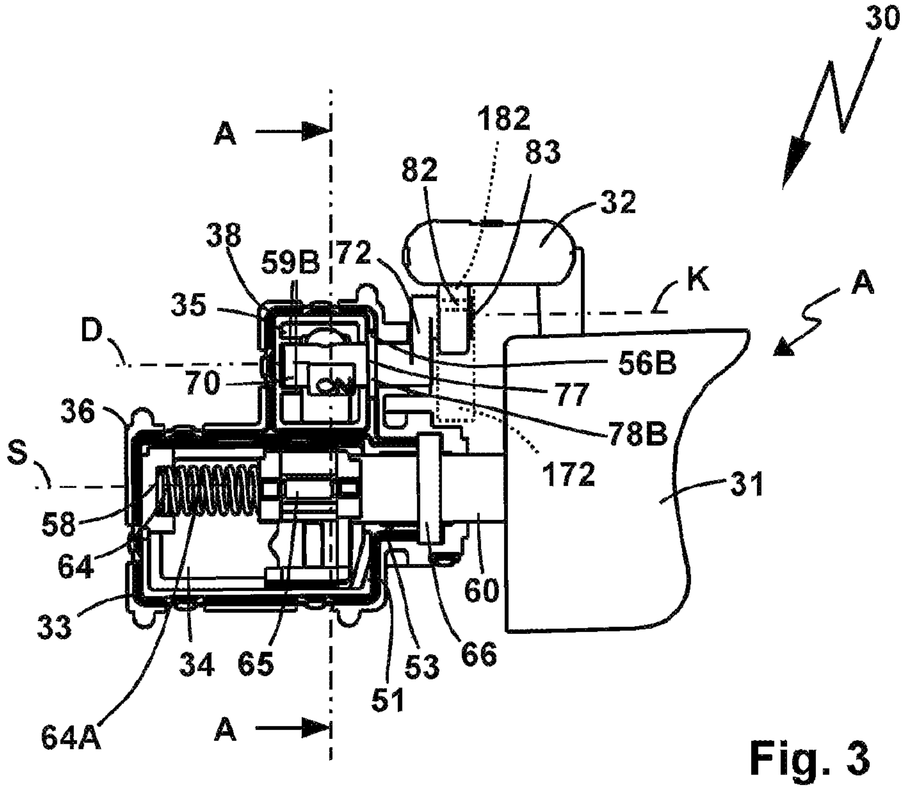
FIG. 3 a side view of the switch according to the above Figures with switch housing open and unactuated second actuating element or switch-on element FIG. 4 the view according to FIG. 3, but with the first actuating element in switch-on position FIG. 5 a perspective oblique view of the switch element according to the above Figures, with the second actuating element in a neutral actuating position FIG. 6 the view according to FIG. 5, but with an actuating element moved into a first actuating position assigned to an anti-clockwise rotation of the drive motor of the hand-operated power tool according to FIG. 1

A hand-operated power tool 10 has a machine casing 11, in which is provided a drive train 15 with a drive motor 16. The drive train 15 is located in a drive section 12, from which there extends a handle section 13 for gripping or grasping by an operator. The handle section 13 extends at an angle from the drive section 12 in the manner of a pistol grip, in particular at an angle of around 80-90°.

The drive motor 16 could drive directly an output element 19 with a suitable tool holder, in which is held for example a screwdriver, a drill or the like. Here, however, a gear 17 is connected between the drive motor 16 and the output element 19.

Provided to control and operate the drive train 15, and therefore the hand-operated power tool 10 as a whole, is a control module 20, which includes a power supply unit 21. The control module 20 is located substantially in the handle section 13. Regarding the machine casing 11 it should also be noted that only the rear other casing part 14 is shown in the drawing, while a complementary casing part, closing the interior of the machine casing 11 together with the shown casing part 14, is not visible in the drawing.

The power supply unit 21 includes a board 22, on which are located various electronic and electrical components for control of the drive motor 16, in particular for its power supply, and not visible in the drawing. Shown schematically, though, are switch elements 23 and 24, for example magnetic sensors. With switch element 23, for example, the power supply unit 21 and therefore the drive motor 16 may be switched on or off. The speed of the drive motor 16 may also be preset by switch element 23. One may also describe switch element 23 as host switch element. With switch element 24, a direction of rotation of the drive motor 16 may be set, for example clockwise or anti-clockwise rotation.

The power supply unit 21 is or may be connected with the aid of lines 25 to the drive motor 16, in particular to its energy coils of an energy coil assembly not shown in detail in the drawing. The drive motor 16 is for example a brushless motor or an electrically commutated motor. But also the use of a switch 30, for switching the switch elements 23 and switch element 24, would be readily possible with a universal motor or other electrical motor.

The power supply unit 21 is or may be connected with the aid of lines 26 to a supply interface 28, via which the hand-operated power tool 10 may be supplied with electrical power. For example, in a manner not shown, an electrical supply cable, e.g. a power cable, may be provided at the supply interface 28 for connection to an electrical supply network, for example with 110 volt or 230 volt a.c. Here however the hand-operated power tool 10 is a hand-operated power tool which may be operated cordlessly. The supply interface 28 serves for the connection of a schematically indicated electrical energy store 29, for example in to form of a battery pack. Energy stored in the energy store 29 is used to supply the power supply unit 21 and thus the drive motor 16.

When operating the hand-operated power tool 10 in especially dust-laden environments, there is however the risk that the sensitive electrical components, switch elements or the like will be contaminated. Especially problematic are ferromagnetic dusts, which can adhere magnetically to magnetic sensors, for example magnetic pick-ups of the switch according to EP 2 395 527 A1. These problems however do not occur with the switch 30, or only to a much reduced extent.

The switch 30 include actuating elements 31 and 32, by which the switch elements 23 and 24 may be actuated. Correspondingly, therefore, the actuating element 31 may be used to switch on and off the drive motor 16 and to influence its speed, while the actuating element 32 is provided for presetting the direction of rotation of the drive motor 16.

The switch 30 has a switch housing 33 in which switch chambers 34 and 35, separate from one another, are provided. The switch housing 33 includes a housing base part 36, which is closed by a housing cover 37. Both switch chambers 34 and 35 are closed on the peripheral side, with the exception of through openings 53, 54, at side walls 51, 52 of the switch chambers 34 and 35. Between the switch chambers 34 and 35 there is also a partition wall 42, which separates the switch chambers 34 and 35 from one another.

The housing base part 36 and the housing cover 37 form housing parts 36A, 37A, complementary to one another and closing the switch chambers 34, 35.

The housing base part 36 has a base 45 from which the peripheral walls 46 extend. The housing cover 37 has a ceiling 47 from which the peripheral walls 48 extend. The end faces of the peripheral walls 46, 48 together with the wall sections of the housing base part 36 and the housing cover 37 lie with their end faces opposite one another.

Provided at these end faces of the peripheral walls 46, 48, together with the partition wall sections of the partition wall 42, are sealing projections 38, 39 for bounding the switch chambers 34, 35, together with complementary seal locations 40, 41 in which the sealing projections 38, 39 engage with sealing and thereby form the seals 38A, 39A. The seals 38A, 39A seal the switch chambers 34, 35 from one another and from the environment. The sealing projections 38, 39 are for example in the form of springs, which engage in the seal locations 40, 41 which are in the form of locating slots.

The sealing projections 38, 39 form together with the seal locations 40, 41 for example labyrinth seals. Instead of the sealing projections 38, 39 it would also readily be possible to provide seal locations into which for example a rubber seal, in particular in the form of an O-ring or a seal lip, is inserted. The sealing projections 38, 39 could also be in the form of elastic sealing projections or rubber sealing projections.

In particular it is advantageous that the switch chambers 34 and 35 are sealed from one another and/or tightly separated from one another by the seals 38A, 39A. For example the seals 38A, 39A comprise a seal section 38B, for example in the form of a labyrinth seal, which extends along an area 35A, where the switch chambers 34 and 35 directly adjoin one another. For example the seal section 38B includes sections of the sealing projections 38, 39 and seal locations 40, 41 which engage in one another in the form of labyrinth seals.

Thus the two switch chambers 34, 35 are sealed by a seal assembly on the one hand from the environment, but on the other hand also relative to one another. Switch actuators 65, 75 accommodated in the interiors of the switch chambers 34, 35 are therefore protected from environmental influences.

The housing base part 36 and the housing cover 37 are latched together with the aid of a latching arrangement. Provided for example on the housing base part 36 are latching projections 43, in particular latching hooks or the like, which engage in latching locations 44 of the housing cover 37. The latching projections 43 and latching locations 44 form a latching arrangement 43A and are provided for example in the area of the peripheral walls 46, 48. Preferably several latching projections and latching locations are provided, spaced apart from one another, so that the housing cover 37 is held securely to the housing base part 36. Naturally, bonding, welding or other similar means of joining housing base part 36 and housing cover 37 would also be possible, so that these two parts are held firmly together and the switch chambers 34, 35 are sealed.

Provided advantageously on the switch housing 33, for example the housing cover 37, are line holders 49 which are suitable for holding lines, in particular the lines 25.

The switch housing 33 is also supported on the circuit board 22 with the aid of support feet 50. Through the support feet 50, a space is provided between the base 45 and the printed circuit board 22, in which the switch elements 23, 24, for example semiconductor elements, are arranged in sandwich fashion. It is possible that the base 45 is in contact with the switch elements 23, 24, for example lying flat against their upper side facing the switch 30. It is however also possible that there is a space between the base 45 and the switch elements 23, 24. From the base 45, a seal projection 51A extends preferably towards the printed circuit board 22 and bounds an interior in which the switch element 23 and/or the switch elements 24 are located. The switch housing 33 is namely advantageously cast with the printed circuit board 22 with the aid of a casting compound 27A, which is kept away from the seal projection 51A, so that the switch elements 23, 24 do not come into contact with the casting compound 27A, but are held as it were in a cavity sealed by the casting compound 27A, the base 45 and the printed circuit board 22. The casting compound 27A forms a cast body 27 which holds the switch housing 33 to the printed circuit board 22 and preferably protects electrical components mounted on the printed circuit board 22 from environmental influences.

The actuating element 31 is connected to the switch actuator 65 with the aid of a transmission body 60. The switch actuator 65 includes for example a magnet or is formed by a magnet 65A, through the effect of which the switch element 23 may be actuated. The transmission body 60 forms part of a sliding guide or a slide bearing 60A. The transmission body 60 has a shaft section 61 which is connected by a holding section 62, for example a holding projection, to the actuating element 31, for example engaging in a holding location 31A, in particular a plug-in socket of the same. The transmission body 60 therefore protrudes from the actuating element 31 towards the switch housing 33, in which it engages.

Located at the longitudinal end of the shaft section 61 opposite the actuating element 31 is a slide 63, which has linear guidance in a slide guide 57 with respect to the sliding axis S. The slide guide 57 is provided in the switch chamber 34, so that the slide 63 is held in the switch chamber 34 movable relative to the sliding axis S or along the sliding axis S. The slide guide 57 comprises e.g. a guide projection 57A and a guide socket 57B on the slide 63 and the switch chamber 34.

The sliding axis S and the rotation axis D are parallel to one another.

Figure 4:
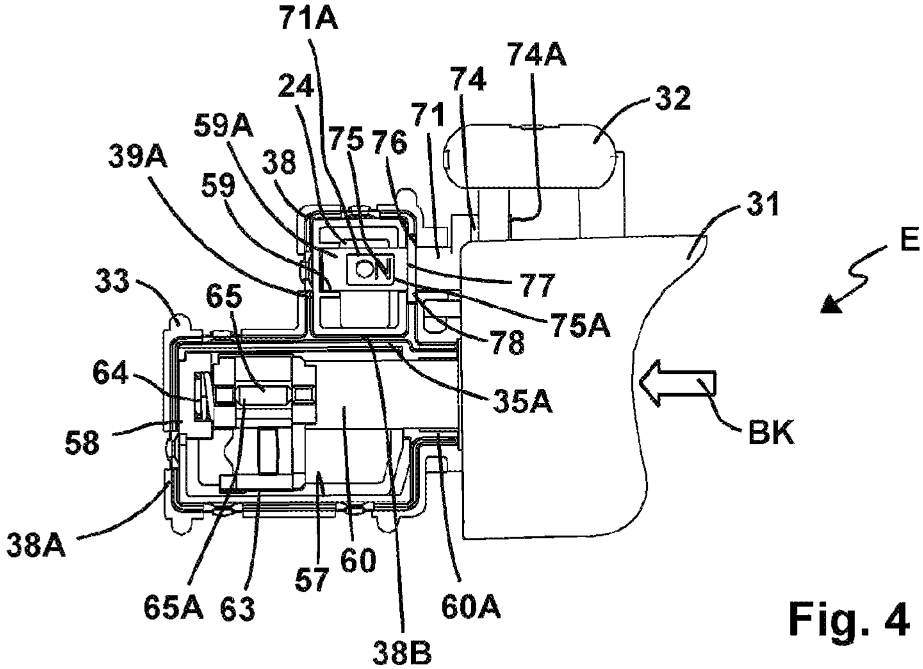
Figure 5:
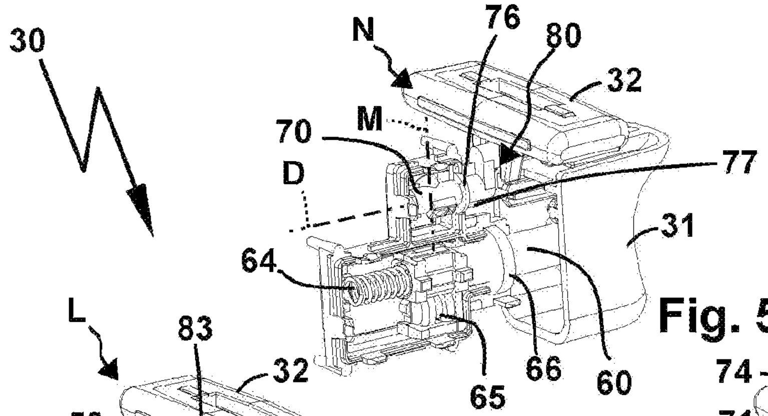
Figure 6:
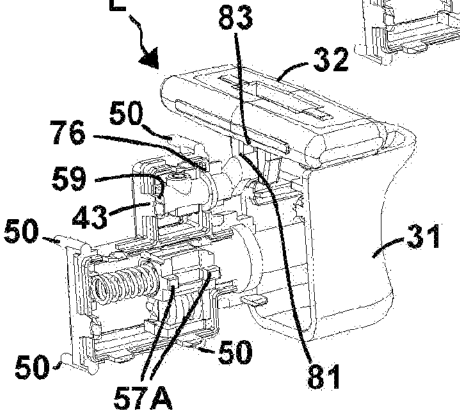
Figure 7:
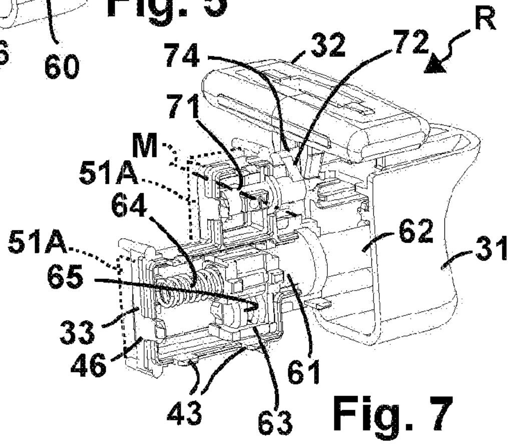
FIG. 7 the view according to FIG. 5 or 6, but with the second actuating element moved into a second actuating position assigned to a clockwise rotation of the drive motor FIG. 8 a section through the switch element according to the above Figures, along a section line A-A in FIG. 3 corresponding to the actuating position according to FIG. 5
Figure 8:
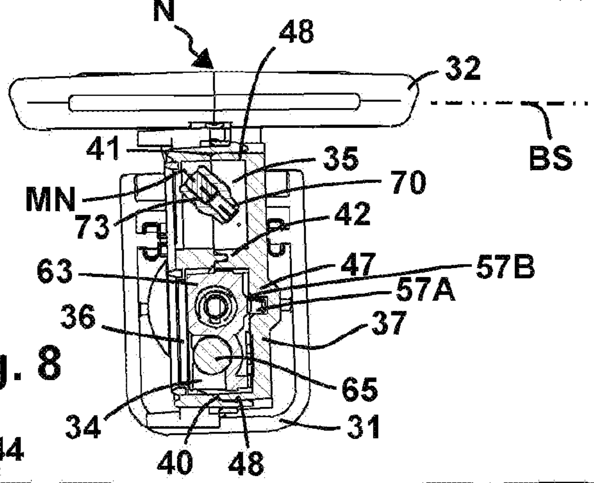
Figure 9:
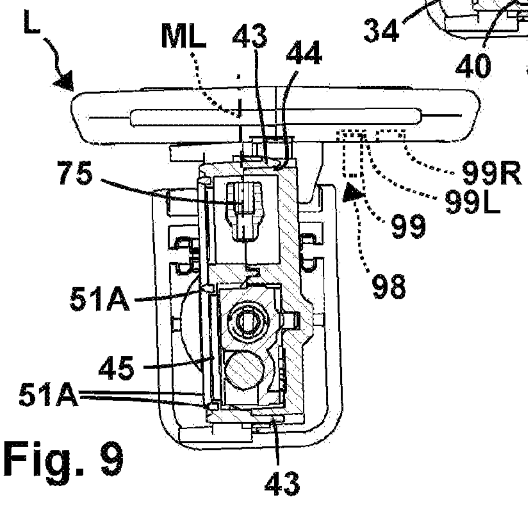
FIG. 9 the section according to FIG. 8, but in the actuating position according to FIG. 6 of the first actuating element FIG. 10 the section according to FIGS. 8, 9, but with the first actuating element moved into the actuating position according to FIG. 7
Figure 10:
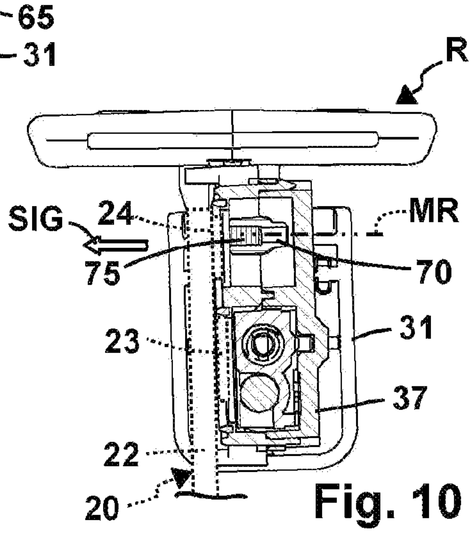
Figure 11:
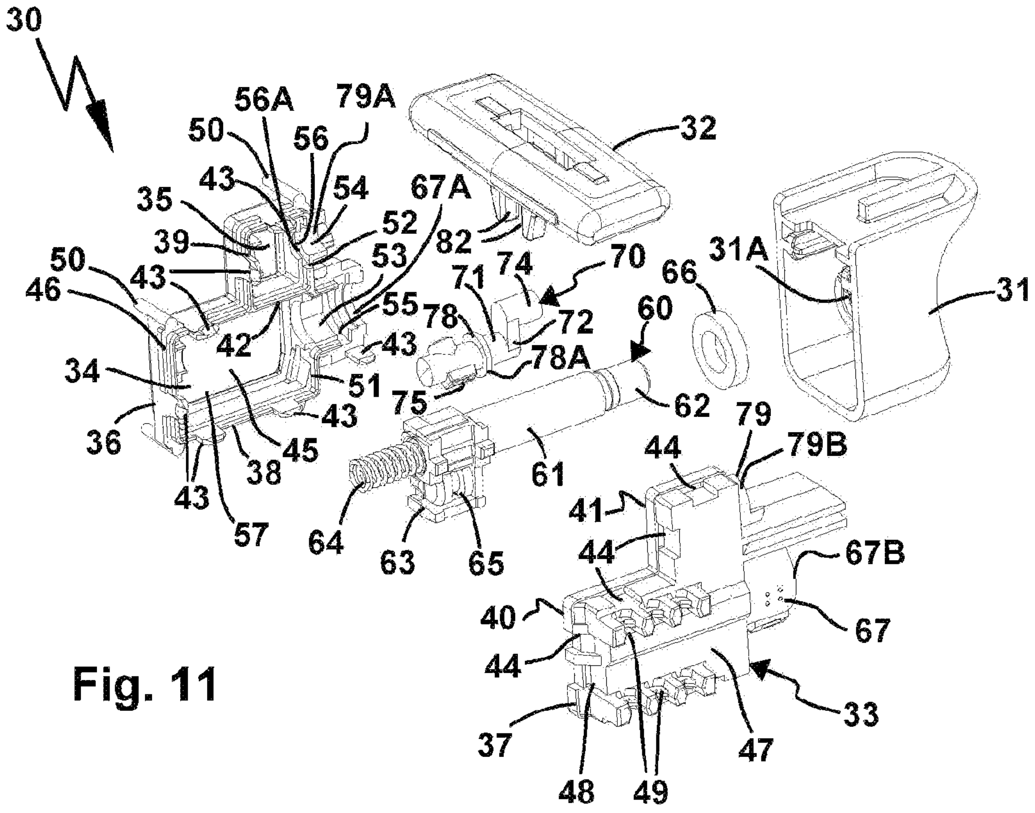
FIG. 11 an exploded view of the switch according to the above Figures.
Figure 12:
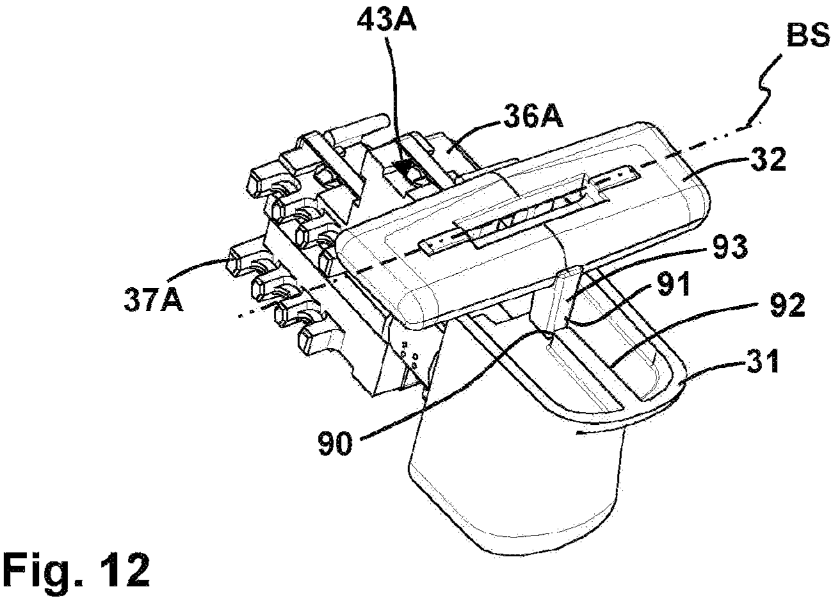
FIG. 12 a perspective oblique view of the switch according to the above Figures, at an angle from above.

The switch actuator 65, for example a magnet, is located on the slide 63. By shifting the slide 63 and thus the switch actuator 65 along the sliding axis S, a relative position of the switch actuator 65 relative to the switch element 22 may be set, so that the latter adopts different switching positions. If then for example, starting from an actuating position A, which corresponds to a switch-off position, the actuating element 31 is actuated in the direction of an actuating position E, i.e. a switch-on position (FIG. 4), then the magnetic field of switch actuator 65 actuates switch element 23, for example to switch the drive motor 16 on or off or to vary its speed.

An advantageous measure provides that, on first actuation of the actuating element 31 from the actuating position A towards the actuating position E, switch element 23 is as it were awoken and the other components of the power supply unit 21 are activated. If the switch element 31 remains unactuated for a predetermined time, i.e. adopts actuating position A, then switch element 23 switches the hand-operated power tool 10 and its electronic components off, in particular the power supply unit 21, going therefore into a kind of sleep mode, so that electrical power consumption is minimal or even switched off.

The switch actuator 65 is biased, through a spring assembly 64A, by a spring 64 which is supported on a side opposite the through opening 53, namely on a support 58, in the direction of actuating position A. Consequently, therefore, the operator may, with the aid of an operating force BK, actuate the switch actuator 65 against the spring force of the spring 64, from actuating position A towards actuating position E.

Preferably provided at the through opening 53, which at the same time represents a bearing location of a slide bearing for the transmission body 60, is a seal 66. The seal 66, for example a seal ring, in particular a seal ring of plastic and/or an O-ring, is penetrated by the transmission body 60 and fits with sealing on its outer periphery. Provided in the switch housing 33, in particular the side wall 51 close to the through opening 53, is a seal location 55, for example an annular slot, for the seal 66. The housing base part 36 and the housing cover 37 have, in the area of the side wall 51, segments 67A, 67B of a bearing location 67 or the through opening 53. At the bearing location 67 or the through opening 53, the transmission body 60 has linear guidance with respect to the sliding axis S. The bearing location 67 comprises for example sleeve-like segments 67A, 67B fitted to the housing base part 36 and the housing cover 37.

Provided for actuation of the switch actuator 75 is a transmission element 70 which, in respect of the switch housing 33, is rotatably mounted around a rotation axis D. The transmission element 70 has a shaft section 71 which is substantially located within the switch chamber 35 and penetrates a through opening 54 on the side wall 52 of the switch chamber 35 or on the switch housing 33. The through opening 54 forms at the same time a bearing location of a rotary bearing 77 on the side wall 52. Provided on the housing base part 36 and on the housing cover 37 are sleeve-like segments 79A, 79B of the bearing location 79 or the through opening 54.

On a side opposite the side wall 52, the shaft section 71 is rotatably mounted at a bearing location 59 of a rotary bearing 59A. For example, to form the bearing location 59, support sections or wall sections 59B protrude from a wall section of the peripheral walls 46 and/or a wall section of the peripheral walls 48.

Between the bearing location 59 and the rotary bearing 77, the switch actuator 75, for example a magnet 75A, is mounted on the shaft section 71, e.g. of a location 73, by which the switch element 24 may be actuated. Depending on a particular rotary position or angular position of the switch actuator 75 relative to the rotation axis D, the switch actuator 75 moves between switching positions assigned to opposite directions of rotation of the drive motor 16, for example, clockwise and anti-clockwise rotation. At the same time the actuating element 32 which is for example in the form of a slide element, adopts actuating positions R and L.

Actuating element 32 is mounted along a positioning axis BS on the machine casing 11. The machine casing 11 has for example a bearing location 95, at which the actuating element 32 is mounted movably relative to the positioning axis BS. In actuating position R, for example a actuating section 96 of the actuating element 32 protrudes further from a side of the machine casing 11 than an actuating section 97 of the actuating element 32 from the other opposite side of the machine casing 11. The operator therefore presses on one of the actuating sections 96 or 97, in order to actuate the actuating element 32 from the actuating position R into the actuating position L or vice-versa.

To transfer the linear movement of the actuating element 32 along the positioning axis BS into a rotary movement of the transmission element 70 around the rotation axis D, a transmission gear 80 is provided. The transmission gear 80 is for example a crank gear 81. For example, there extends at an angle, in particular at a right-angle, from the shaft section 71 of the transmission element 70, a crank arm 72. From the crank arm 72 in turn extends an actuating arm 74, with the actuating arm 74, the crank arm 72 and the shaft section 71 being stepped when viewed from the side. Thus, a longitudinal axis of the shaft section 71 (corresponding to the rotation axis D) and a longitudinal axis of the actuating arm 74 are parallel to one another.

The crank arm 72 is rotatable around the rotation axis D and swivels in a circular path around the rotation axis D. The crank arm 72 is held pivotably, around a swivel axis K, between driving projections 82 which protrude from the actuating element 32. Provided between the driving projections 82, therefore, is a rotary bearing or swivel bearing 83 with the rotation axis or swivel axis K for the actuating arm 74. Thus the components of the transmission element 70 and the rotary bearing 82 located outside the switch housing 33 form the crank gear 81.

Shown schematically in the drawing but readily possible, is for example also that instead of the crank arm 72, a gear 172 is provided on the shaft section 71 and engages with a tooth section 182 of the actuating element 32, which is for example located on the side of the actuating element 32 facing this gear 172 and extends between its actuating sections 96, 97.

The crank gear 81 and therefore the transmission gear 80 are located outside the switch housing 33. The switch actuator 75, for example a magnet, on the other hand is located inside the switch housing 33, namely the switch chamber 35.

The actuating arm 74 forms a drive section 74A of the transmission gear 80 and at the same time of the transmission element 70. The shaft section 71 forms an output section 71A of the transmission gear 80 and at the same time of the transmission element 70. The transmission element 70 therefore has the drive section 74A and the output section 71A as integral parts.

Provided on the rotary bearing 77 is a seal 76, so that the transition zone between the transmission element 70 and the switch chamber 35 is sealed. The seal 76 comprises for example a seal flange 78, for example designed as an annular flange 78B, which extends radially outwards from the shaft section 71 and engages in a seal location 56 of the switch housing 33. The seal location 56 comprises for example an annular slot 56B in the side wall 52.

The seal flange 78 and the seal location 56 also hold the transmission element 70, in respect of the rotation axis D, on the switch housing 33 with longitudinal movement capability. Thus the seal flange 78 and the seal location 56 form shift-lock contours 78A and 56A, which hold the transmission element 70 non-displaceably relative to the rotation axis D, at the through opening 54. The shift-lock contours 78A and 56A engage positively in one another and/or have or form support contours perpendicular to the rotation axis D, so that they hold the transmission element 70 non-displaceably relative to the rotation axis D. However the shift-lock contours 78A and 56A allow rotatability of the transmission element 70 around the rotation axis D relative to the switch housing 33.

Depending on the respective angular position or switching position MN, ML, MR of the switch actuator 75, for example of the magnet, the switch element 24 assumes various switching positions, with which then for example clockwise or anti-clockwise rotation of the drive motor 16 may be set. The switching positions MN, ML, MR are assigned to the actuating positions N, L, R of the actuating element 32 and/or correlate with these actuating positions. In the switching positions MN, ML, MR, a magnetic field of the switch actuator 75 may penetrate the switch element 24 in different directions, so that the switch element 24 for example is activated for example to output different sensor signals or control signals SIG to a control unit 21A, for example a microcontroller. With the aid of these control signals or sensor signals, the switch element 24 specifies to the control unit 21A that the latter should trigger the power supply unit 21 to supply power to the drive motor 16 for anti-clockwise or clockwise rotation.

If however no clear direction of rotation is set, i.e. the actuating element 32 adopts a middle or neutral actuating position N and the switch actuator 75 the middle, as it were undefined, switching position MN, then blocking contours 90, 91 ensure that the actuating element 31 cannot be actuated from its actuating position A into one of the actuating positions E. On the other hand, if the actuating element 31 is actuated in one of the actuating positions E, then a change in the direction of rotation of the drive motor 16 is blocked, i.e. the blocking contours 90, 91 prevent any movement of the actuating element 32 out of the actuating position R into the actuating position L and vice-versa when the actuating element 31 is actuated into one of the actuating positions E i.e. a switch-on position of the drive motor 16 is actuated.

The blocking contours 90, 91 act directly on one another. It is advantageous that the blocking contours 90, 91 do not act directly on the transmission gear 80 or its components. The blocking contours 90, 91 are expediently not in engagement and/or direct contact with the transmission gear 80 or its components and/or the transmission element 70.

The blocking contours 90, 91 include for example blocking projections 92, 93 on the actuating elements 31, 32. The blocking projection 92 projects for example beyond a top of the actuating element 31 facing the actuating element 32. In particular the blocking projection 92 is designed as a rib. From the actuating element 32, the blocking contour 91 protrudes in the manner of a blocking projection 93. In the actuating position N, the blocking projections 92, 93 strike against each other, so that actuation of the actuating element 31 in the direction of one of the actuating positions E is not possible.

Next to the blocking projection 92 are open spaces or recesses in which the blocking projection 93 can engage when the actuating element 32 is moved into one of the actuating positions R or L. Then it is possible for actuating element 31 to be moved from actuating position A into one of the actuating positions E. On the other hand, however, it is not then possible for the blocking projection 93 to be actuated past the blocking projection 92 from one of the actuating positions R, L into the respective other actuating position L, R. Then the blocking projection 93 strikes against the sides of blocking projection 92 which extend parallel to the sliding axis S.

The actuating element 32 may preferably be locked with the aid of a latching arrangement 98. The latching arrangement comprises for example a latching projection 99, immovable relative to the switch housing 33 and/or the machine casing 11, which engages in one of two latching recesses 99R, 99L in the actuating positions R, L.

The invention claimed is:

1. A switch for a hand-held power tool, which has an electric drive motor that can be switched on by the switch, wherein the switch has a switch housing with a switch chamber in which a first switch actuator that can be moved between at least two switch positions is arranged in order to actuate a first electric switch element and is movement-coupled via a first transmission element to a first actuating element of the switch, located outside the switch housing and movable between at least two actuating positions, wherein the transmission element passes through a first through opening in a wall of the switch housing, so that the switch actuator is moved by moving the first actuating element to actuate the first electric switch element and wherein, at the first through opening, there is provided a rotary bearing, on which the transmission element is rotatably mounted around a rotation axis, and wherein the switch has a second actuating element, located outside the switch housing and adjustable between at least two actuating positions, and a second switch actuator actuatable by the second actuating element to actuate a second electrical switch element, wherein the second actuating element is movement-coupled to the second switch actuator via a second transmission element, which penetrates a second through opening in a wall of the switch housing, and wherein the second transmission element is mounted for linear movement along a sliding axis with respect to the switch housing and/or the second transmission element penetrates the second through opening with linear movement along a sliding axis, and wherein the sliding axis is parallel to the rotation axis or runs at an angle of less the 90° to the rotation axis.

2. The switch according to claim 1, wherein the rotation axis passes through a wall of the switch housing in which the rotary bearing is provided.

3. The switch according to claim 1, wherein the rotation axis is at an angle to a wall face of the wall on which the rotary bearing is provided.

4. The switch according to claim 1, wherein the switch chamber is closed with the exception of the first and second through openings.

5. The switch according to claim 1 wherein, at the first through opening, shift-lock contours and/or a shift-lock are provided for a non-displaceable hold of the first actuating element parallel to the rotation axis or along the rotation axis.

6. The switch according to claim 1, wherein at one of the first or second through opening, there is provided at least one partly annular or completely annular flange, which engages in a partly annular or completely annular slot.

7. The switch according to claim 1, wherein the first actuating element is translationally mounted on a slide bearing relative to the switch housing.

8. The switch according to claim 1, wherein the first transmission element is rotatably mounted, with longitudinal clearance relative to the rotation axis to the rotary bearing which is located on the wall of the switch housing, to the switch housing.

9. The switch according to claim 1, wherein the first and second actuating elements are arranged on the same side of the switch housing and/or the first through opening and the second through opening are arranged on side walls flush with one another or a common side wall and/or the same flat side of the switch housing.

10. The switch according to claim 1, wherein a drive section of the transmission gear in engagement with the first actuating element is located in a space between the switch housing and the second actuating element or protrudes into that space.

11. The switch according to claim 1, wherein the second switch chamber is closed except for the second through opening.

12. The switch according to claim 1, wherein a seal is provided at the second through opening.

13. The switch according to claim 1, wherein the first switch actuator and the first switch element are provided and designed for presetting a direction of rotation of the drive motor of the hand-operated power tool and/or the second switch actuator and the second switch element for switching on and off and/or for changing a speed of the drive motor of the hand-operated power tool.

14. The switch according to claim 1, further comprising a spring assembly for biasing at least one switch actuator into a predetermined switching position and/or a latching arrangement for engaging at least one switch actuator in a predetermined switching position.

15. The switch according to claim 1, wherein at least one of the first and second switch actuators is a non-contact switch actuator and/or a magnet or includes a magnet sensor.

16. The switch according to claim 1, wherein at least one of the electrical switch elements is located outside the switch housing and/or on a printed circuit board.

17. The switch according to claim 1, wherein at least one electrical switch element which is operated by the switch is provided on a printed circuit board and is arranged between the switch housing and the printed circuit board, and/or the at least one electrical siwtch is cast on a printed circuit board within a casting compound.

18. The switch according to claim 1, wherein at least one of the first and second switch actuators and at least one of the first and second electrical switch elements are actuable from a sleep mode into an active mode, wherein the first or second switch element and an electrical device of the hand-operated power tool, actuable by the first or second switch element and connected electrically to it, in the sleep mode uses no electrical energy or less electrical energy than in the active mode.

19. The hand-operated power tool with the switch according to claim 1.

20. The switch according to claim 1, wherein the first transmission element comprises:

a shaft section passing through the first through opening along the rotation axis;

a crank arm extending perpendicularly from the shaft section outside of the switch housing; and an actuating arm extending from the crank arm parallel to the rotation axis and extending to the first actuating element.

21. The switch according to claim 1, wherein there is provided at the first through opening and/or the rotary bearing a seal, or wherein the first through opening and/or the rotary bearing are in the form of a seal or have a seal.

22. The switch according to claim 21, wherein the seal encompasses the first transmission element annularly.

23. The switch according to claim 21, wherein the seal comprises a seal flange which engages in an annular seal location.

24. The switch according to claim 21 wherein the seal comprises a labyrinth seal.

25. The switch according to claim 1, wherein a transmission gear is provided between the first switch actuator and the first actuating element.

26. The switch according to claim 25, wherein the transmission gear is located outside the switch housing.

27. The switch according to claim 25, wherein the transmission gear is provided to convert a linear movement or translational movement of the first actuating element into a rotational movement of the first switch actuator.

28. The switch according to claim 25, wherein the transmission gear comprises or is formed by a crank gear and/or a toothed gearing.

29. The switch according to claim 1, wherein at least one of the first and second actuating elements has blocking contours for blocking the other of the first and second actuating element, wherein the at least one of the first and second actuating element having the blocking contours, in a predetermined actuating position, blocks an actuation of the other of the first and second actuating element from a first actuating position into a second actuating position.

30. The switch according to claim 29, wherein the first and second actuating elements are configured to block actuation of each other in the predetermined actuating position.

31. The switch according to claim 29 wherein the blocking contours are not in direct contact with and/or disengaged from the transmission element and/or a transmission gear between the first transmission element and the first actuating element which actuates it.

32. The switch according to claim 1, wherein the switch chamber accommodating the first switch actuator forms a first switch chamber and the second switch actuator is located in a second switch chamber separate from this first switch chamber.

33. The switch according to claim 32, wherein the first and the second switch chamber are separated or screened off from one another by a partition wall.

34. The switch according to claim 32, wherein the first switch chamber is sealed off from the second switch chamber.

35. The switch according to claim 1, wherein the switch housing has a housing base part and a housing cover for closing the housing base part, wherein one segment of at least one of the first and second through openings is provided for a first or second transmission element on the housing base part and on the housing cover, so that the housing base part and the housing cover form the first or second through opening in a complementary manner and encompass the first or second transmission element when they are fitted together.

36. The switch according to claim 35, wherein between the housing top part and the housing base part, there is provided at least one seal and/or wherein the housing base part and the housing cover are locked together with a latching arrangement.

37. A switch for a hand-held power tool, which has an electric drive motor that can be switched on by the switch, wherein the switch has a switch housing with a switch chamber in which a switch actuator that can be moved between at least two switch positions is arranged in order to actuate an electric switch element and is movement-coupled via a transmission element to an actuating element of the switch, located outside the switch housing and movable between at least two actuating positions, wherein the transmission element passes through a through opening in a wall of the switch housing, so that the switch actutor is moved by moving the actuating element to actuate the switch element and wherein, at the through opening, there is provided a rotary bearing, on which the transmission element is rotatably mounted around a rotation axis, and wherein the switch actuator is a non-contact switch actuator and/or a magnet or includes a magnet sensor.

38. The switch according to claim 37, wherein the actuating element forms a first actuating element and the switch actuator forms a first switch actuator to actuate the electrical switch element forming a first switch element and wherein the switch has a second actuating element, located outside the switch housing and adjustable between at least two actuating positions, and a second switch actuator, actuable by the second actuating element to actuate a second electrical switch element, wherein the second actuating element is movement-coupled to the second switch actuator via a second transmission element, which penetrates a second through opening in a wall of the switch housing.

39. The switch according to claim 38, wherein the second transmission element is mounted for linear movement along a sliding axis with respect to the switch housing and/or the second transmission element penetrates the second through opening with linear movement along a sliding axis.

40. The switch according to claim 39, wherein the sliding axis is parallel to the rotation axis or runs at an angle of less than 90° to the rotation axis.

41. A switch for a hand-held power tool, which has an electric drive motor that can be switch on by the switch, wherein the switch has a switch housing with a switch chamber in which a switch actuator that can be moved between at least two switch positions is arranged in order to actuate an electric switch element and is movement-coupled via a transmission element to an actuating element of the switch, located outside the switch housing and movable between at least two actuating positions, wherein the transmission element passes through a through opening in a wall of the switch housing, so that the switch actuator is moved by moving the actuating element to actuate the switch element and wherein, at the through opening, there is provided a rotary bearing, on which the transmission element is rotatably mounted around a rotation axis, and wherein the electrical switch element which is operated by the switch is provided on a printed circuit board and is arranged between the switch housing and the printed circuit board, the circuit board being encapsulated in the switch housing using a potting compound.

* * * * *